United States Patent [19]

Field et al.

[11] Patent Number: 4,600,942
[45] Date of Patent: Jul. 15, 1986

[54] SECURE CODING AND DECODING SYSTEM AND METHOD FOR TELEVISION PROGRAM SIGNALS

[75] Inventors: Robert W. Field, Fountain Valley; Clarence D. Perr, Brea; Ronald R. Gerlach, Mission Viejo, all of Calif.

[73] Assignee: Telease, Inc., Los Angeles, Calif.

[21] Appl. No.: 675,452

[22] Filed: Nov. 27, 1984

Related U.S. Application Data

[63] Continuation of Ser. No. 403,107, Jul. 29, 1982, abandoned.

[51] Int. Cl.⁴ .................. H04N 7/167; H04L 9/00
[52] U.S. Cl. .................. 358/122; 178/22.12; 178/22.13; 178/22.14; 358/119; 358/123
[58] Field of Search ............ 358/119, 122, 117, 123; 178/22.12, 22.13, 22.14

[56] References Cited

U.S. PATENT DOCUMENTS

| | | | |
|---|---|---|---|
| 2,961,481 | 11/1960 | Hammond, Jr. et al. | 358/124 |
| 2,972,008 | 2/1961 | Ridenour et al. | 358/123 |
| 4,070,693 | 1/1978 | Shutterly | 358/123 |
| 4,225,884 | 9/1980 | Block et al. | 358/124 |
| 4,333,107 | 6/1982 | McGuire et al. | 358/123 |
| 4,388,643 | 6/1983 | Aminetzah | 358/123 |
| 4,389,671 | 6/1983 | Posner et al. | 358/124 |
| 4,405,942 | 9/1983 | Block et al. | 358/119 |

*Primary Examiner*—S. C. Buczinski
*Attorney, Agent, or Firm*—Burns, Doane, Swecker & Mathis

[57] ABSTRACT

Parts of a composite video signal, such as segments of each horizontal scan line, are stored in analog storage devices and retrieved therefrom in a cyclic manner to rearrange them and thereby encode the signal. The cyclic retrieval of the information from the storage devices is carried out on a selective basis in accordance with the binary state of a pseudo-random signal that is generated independently at each of the encoding and decoding stations. Synchronization of the two independently generated signals is provided by a control word and an initialization word that are transmitted with the encoded video signal, one of which is encrypted. Decryption of the word is carried out with a master key at each of the encoding and decoding stations.

29 Claims, 16 Drawing Figures

ENCODER/DECODER

FIG. 4.

CYCLE SEQUENCE GENERATOR

ENCODER CONTROL UNIT
FIG. 9.

DECODER CONTROL UNIT

FIG. 10.

SECURE CODING AND DECODING SYSTEM AND METHOD FOR TELEVISION PROGRAM SIGNALS

This application is a continuation of application Ser. No. 403,107, filed July 29, 1982, now abandoned.

BACKGROUND OF THE INVENTION

The present invention relates to the encoding and decoding of video information and, more particularly, to a method and system for secure transmission of television signals for subscription television or similar video services in which only authorized viewers are permitted to view a video program.

With the increased interest and activity in the field of subscription or pay video transmission of all types (e.g., broadcast and cable subscription television, long distance satellite transmission, television transmission of textual information, etc.), there has arisen a need for more secure transmission of high quality video information. To this end, numerous video encoding or scrambling techniques have been developed and some are now in use, particularly in broadcast systems where there is no control over who receives the signals and thus the signals must be encoded to prevent unauthorized use of the received signals.

One known type of broadcast subscription television system transmits a video signal that is modulated by a sine wave signal such that the blanking and synchronizing levels cannot be recognized by a normal television receiver. The display, without decoding, is unintelligible or at least very annoying to a viewer. However, by rather simple means that are readily available to an average consumer, the system can be easily defeated by non-subscribers. As this becomes more widely known to the public, the number of unauthorized viewers grows and the incentive to pay for the services diminishes. This, in turn, detracts from the desirability on the part of video program producers to permit the use of their programming, particularly if they are paid as a function of authorized viewers or revenues collected.

Other approaches to television signal scrambling have proven to be more secure and may, in fact, make it practically impossible to unscramble the video signals without highly sophisticated and extremely expensive equipment. One such approach is to invert lines or fields of video information on some basis that can be reproduced at the subscriber location to permit viewing of a normal picture. Thus, for example, one known system inverts alternate parts of the video information and a decoder at the subscriber location can reinvert those inverted portions to reconstitute the original video. Another known system inverts fields of video information on a random basis and sends a code with the scrambled video to instruct the decoder as to how the received video has been inverted. An example of this latter type of system is disclosed in U.S. Pat. No. 4,024,576.

Security tends to be adequate in approaches to video scrambling in which the video information is randomly inverted and a secure code is transmitted with the video so that the decoder can properly reinvert, but difficulties arise with respect to picture quality. For example, inversion and reinversion of video signals may result in a reconstituted video signal that varies in d.c. level from line-to-line or field-to-field. Because of this variation, a flicker or other annoying effect appears in the television display making it unpleasant for viewing.

Various measures have been employed to eliminate or at least reduce this problem with varying degrees of success. Clamping the video signals to the same d.c. level has been somewhat successful, but some annoying effects may still remain. Also, the additional circuitry required to eliminate or reduce the annoying effects of these types of scrambling add cost and complexity to the decoders. Less expensive and perhaps more effective approaches, such as less frequent inversion, have been suggested, but they seem to have a tendency to reduce the security of transmission and only serve to reduce the annoyance, not eliminate it.

It is accordingly a general object of the present invention to provide a novel method and system for scrambling or encoding television signals wherein the difficulties of the prior art systems mentioned above are obviated.

It is a further object of the present invention to provide a novel television video encoding and decoding method and system in which there is an extremely high amount of security, wherein the encoding is sufficient to render an encoded television signal unintelligible or at least extremely annoying to watch, and wherein the decoded video signal is devoid of annoying abnormalities introduced during encoding, yet no special efforts must be made to eliminate encoding abnormalities.

It is another object of the present invention to provide a novel television signal scrambling system particularly suitable for broadcast pay television or other television systems meant only for authorized users.

One system that is directed to achieving these general objectives is disclosed in copending application Ser. No. 124,656, filed on Feb. 25, 1980 by Robert S. Block et al. In the system disclosed therein, the video signal is encoded by delaying parts of the signal relative to other parts in a determinable manner to thereby rearrange the sequence of transmission of the parts in a fashion that can be reproduced at a remote location. Generally, this rearrangement is accomplished by storing successive parts of the video signal and retrieving the stored parts in an order or sequence other than their normal sequence.

The rearrangement of the sequence of video signal parts can be accomplished on a line basis or a field basis. In the specific embodiments of the invention disclosed in the previously mentioned patent application, each part of the video signal that is to be delayed relative to another part comprises one or more digital samples of the signal. For example, each horizontal line of the signal can be divided into 256 segments of digital information that are stored and rearranged relative to one another to thereby scramble the signal. The rearrangement can be accomplished by the manner in which the segments are stored in a storage device such as a shift register, or the manner in which it is retrieved therefrom.

The system disclosed in the noted application has been determined to be successful in achieving the foregoing objects. It is an objective of the present invention to provide a method and system for secure transmission of video signals that is an improved version of that system, particularly from the standpoints of cost and security. More specifically, when a video signal is digitized prior to rearrangement of its various parts, the hardware necessary to carry out the analog-to-digital conversion of the signal is relatively expensive, in comparison with the other components of the signal encoding or decoding system. Consequently it is desirable to be able to rearrange the parts of the signal while they are in an analog format, to thereby forego with the expenses associated with the conversion of the signal into digital samples prior to scrambling, and subsequent reconversion of the scrambled signal into analog form for transmission.

Furthermore, a digital implementation of the scrambling technique imposes a practical limitation on the portions of the signal that can be rearranged. When the video information contained in each horizontal line of the signal is digitized and subsequently reconverted to analog form, the information can be recaptured relatively error free. However, because of the nature of the synchronization pulses and associated timing information in each line of the video signal, any reliable digitization and subsequent reconversion of this portion of the signal requires relatively complex and expensive equipment when utilizing presently-known technology. Consequently, in a practical system the video and synchronization portions of the signal are separated, and only the video information portion of each line of the signal is digitized and scrambled. The synchronization information is not encrypted and is recombined with the scrambled video portion of the signal before transmission.

It is a more specific object of the present invention to provide a novel method and system for encoding and decoding a television signal that performs the encoding and decoding operations while the signal is in an analog format, to thereby avoid the costs associated with converting a signal into digital form and subsequently reconverting it into an analog signal.

It is yet another object of the present invention to provide a novel method and system of this type in which various portions of a video signal are rearranged relative to each other so that both the synchronization pulses and the video information are not suitable for use by a conventional television receiver while in their scrambled form.

It is still a further object of the present invention to provide a novel system for controlling the encoding and decoding of a television signal with a pseudo-random control signal that is not transmitted with the television signal.

It is still another object of the present invention to provide a highly secure system for controlling the encoding and decoding of a television signal with a code that is generated independently at both the transmitting and receiving ends of a television system in accordance with a control word that is transmitted in an encrypted form with the television signal.

SUMMARY OF THE INVENTION

In accordance with the present invention, the foregoing objects and their attendant advantages are achieved by feeding a composite television signal comprising both video and timing or synchronization information into a series of analog delay devices and retrieving the information from the delay devices in a predetermined cyclic fashion so that one part of the signal is delayed relative to another. In a preferred embodiment, each horizontal line of the television signal is divided into two segments by analog delay devices, each having a delay period equal to one-half the horizontal scan period. The two segments of each line overlap one another slightly to thereby eliminate switching transients when the signal is reconstituted in its original form. To compensate for the overlapping portions of the signal, another portion of the signal that can be easily reconstituted at the receiving end is omitted from the transmitted signal.

The encoding of the television signal is carried out selectively in accordance with the binary state of a pseudo-random binary signal. This pseudo-random signal is generated independently at each of the transmitting and receiving stations, rather than being transmitted with the television signal, to thereby provide a higher level of security. Synchronization of the two independently generated signals is assured by a control word and an initialization word that are periodically transmitted with the television signal, and at least one of which is encrypted prior to transmission. Decryption of the control or initialization word is carried out with a secret key stored at the receiving station. Thus, even if an unauthorized user is in possession of the schematics for the decoding circuits, it will not be possible to decode the scrambled signal since the pseudo-random signal cannot be generated without the secret key.

The manner in which the present invention operates in accordance with the foregoing principles will become more readily apparent upon a perusal of the following detailed description of preferred embodiments of the invention illustrated in the accompanying drawings.

DETAILED DESCRIPTION

Figures 1A, 1B:
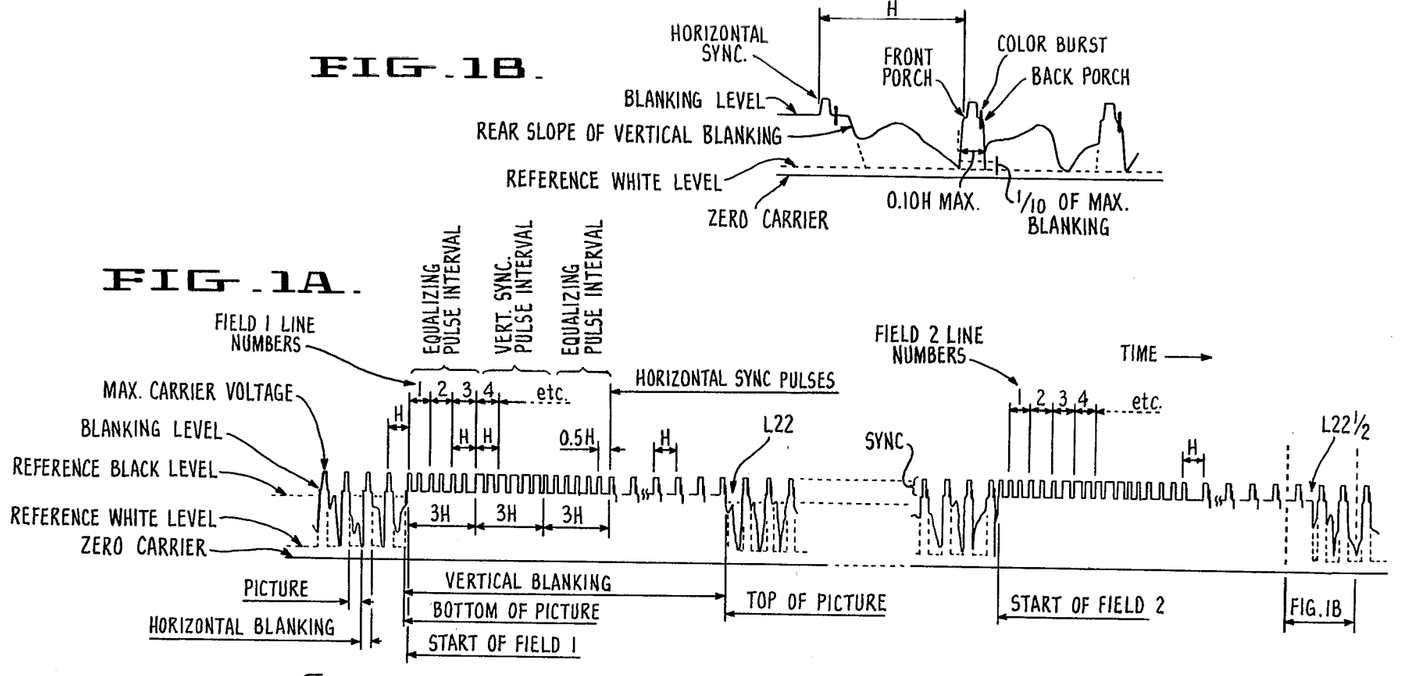
FIGS. 1A and 1B are illustrations of color television signals of the type employed in the United States.

FIGS. 1A and 1B illustrate a standard or normal color television signal before it is superimposed on a carrier for transmission (or after demodulation).

This illustrated signal is the standard for the United States but it is to be noted that the "standard" or "normal" television signal for other countries may differ somewhat. Accordingly, FIGS. 1A and 1B are illustrative of only one of a possible number of television signals. As is illustrated in FIG. 1A, the color television signal is composed of consecutive fields each including synchronizing signals which contain timing information and video signals which convey color and contrast information. Each field commences with a vertical blanking interval comprised of equalizing pulses, vertical synchronization pulses and horizontal synchronization pulses. At the TV receiver, this vertical blanking interval (also referred to as the blanking pulse) blanks the cathode ray tube beam as it is returned from the bottom to the top of the display (TV screen), and the horizontal scanning circuits are stabilized in synchronization with the horizontal sync pulses prior to the arrival of the first horizontal line of video information.

At the end of the vertical blanking interval, a horizontal sync pulse signifies the start of the scanning of a line of video information from one edge of the television display or picture tube to the other edge, normally from left to right when viewed from the front of the picture tube. The video signal information modulates the electron beam (or electron beams in a color system) as the beam is scanned. A horizontal blanking pulse blanks the retrace of the electron beam from right to left and a horizontal sync pulse then signifies the start of the next line of video information. Two consecutive lines of video information (actually 1½ consecutive lines at the beginning of a second field of video information) are shown in FIG. 1B.

Figure 1C:
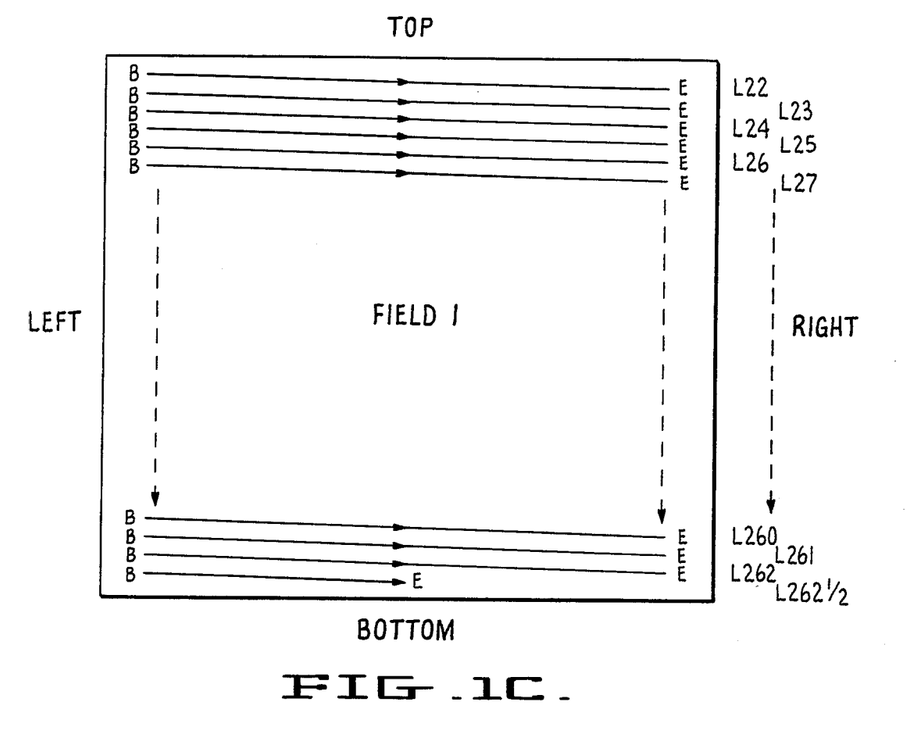
FIGS. 1C and 1D are pictorial representations of the scanning of two successive fields of video information on a television picture tube.
Figure 1D:
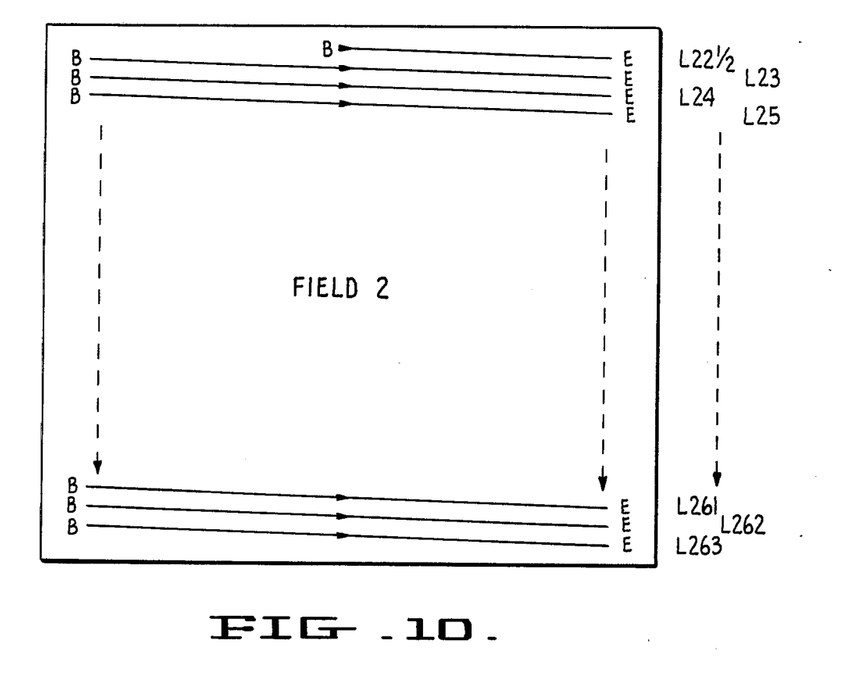

The result of scanning two consecutive fields of video information as seen by a viewer on the face of the picture tube is illustrated in FIGS. 1C and 1D. As can be seen in FIG. 1C, the face of the cathode ray picture tube is scanned with video information starting at the top left and ending at the bottom right of the display. Since the first 21 horizontal sync pulses are used to stablize the horizontal sync circuits during vertical blanking, the first visible scanline of the first field is the twenty-second line (L22). Moreover, in the first field, for purposes of interlacing with the lines of the second field, the last line scanned is a half line. Thus, the first field can be described as containing lines 22 through 262½. The second field is similar except that for the purpose of interlacing the very first scanned line is a half line and the last line is a whole line. Thus, the second field can be considered to contain lines 22½ through 263, or alternatively lines 263 through 525. The two consecutive fields of interlaced lines together comprise one frame of the television program. In FIGS. 1C and 1D, the beginning and end of each horizontal scan line is designated B and E, respectively, to faciliate an understanding of the present invention.

In accordance with the invention, the normal TV signal is encoded or scrambled such that if the video information contained in the encoded signal were displayed by a standard television receiver without decoding, the resultant picture presented to the viewer would have parts rearranged in sequence relative to their normal positions in the scanning sequence. The parts that are rearranged may be individual scan lines (e.g., the sequence of scan lines in a field can be rearranged), the fields, or other parts of the video signal such as individual segments of a scan line. As will be appreciated this rearrangement of sequence of video signal parts will result in a picture that is unintelligible or at least very annoying to watch.

Figure 2A:
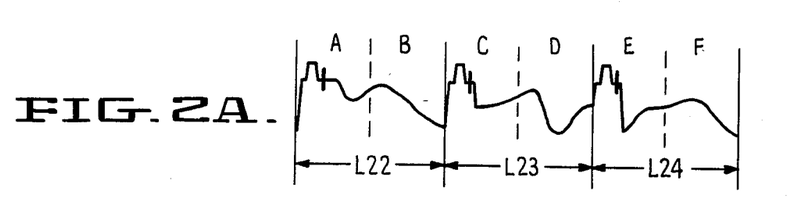
FIGS. 2A and 2B are illustrations of three horizontal scan lines of a television signal in its unscrambled state and in a scrambled state according to one technique used in the present invention.
Figure 2B:
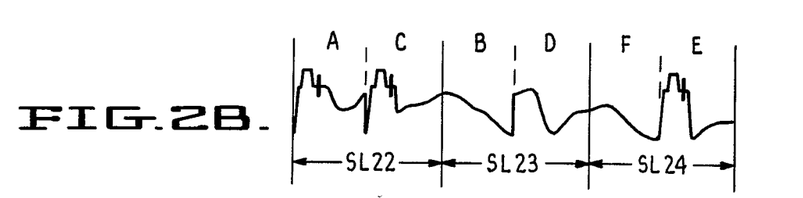

To faciliate an understanding of the invention, the rearrangement of individual portions of scan lines in accordance with one preferred embodiment of the invention is illustrated in FIGS. 2A-B. Each of the horizontal scan lines is divided into two segments. The half-line segments for three consecutive lines are respectively labeled A, B, C . . . F. The first half of each line, i.e. A, C, E, contains synchronization information and some video information. The second half of each line, i.e. B, D, F, contains the remaining video information. The various segments are rearranged according to the encoding scheme A, C, B, D, F, E, resulting in the scrambled signal illustrated in FIG. 2B. It will be appreciated that a signal of this type will cause an unintelligible picture to be displayed on the television screen if it is not first unscrambled. The first line of the scrambled signal, SL22, contains two horizontal synchronizing pulses and portions of the video information for the left-hand portion of two consecutive lines of the normal signal, as viewed in FIGS. 1C and 1D. The next line, SL23, contains no synchronizing information, and the following line SL24 contains one synchronizing pulse, but that pulse is located in the middle of the line, rather than the beginning thereof. Thus, not only is the video information in the television signal scrambled, but the synchronization information necessary for proper operation of the receiver scanning circuits is also unusable.

Figure 3A:
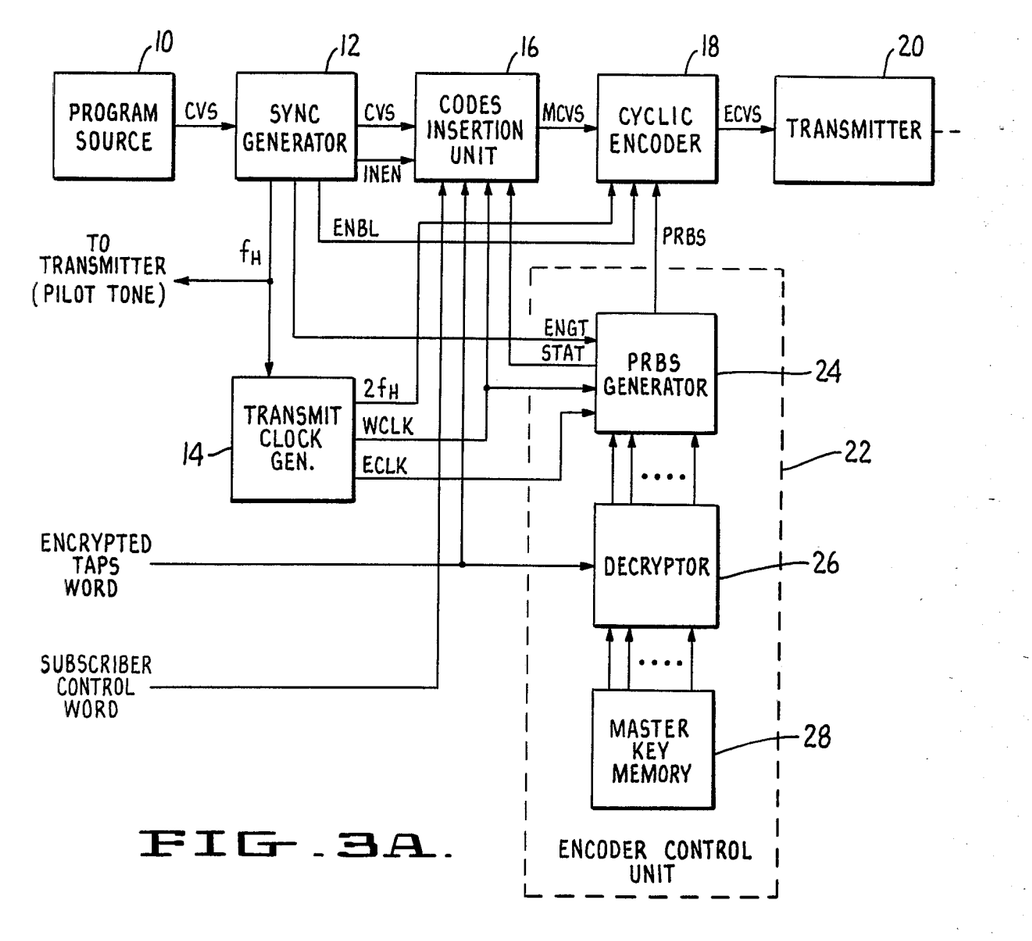
FIG. 3A is a block circuit diagram of the transmitting end of a television encoding/decoding system embodying the present invention.

Apparatus for transmitting a television signal in this scrambled form and subsequently receiving and descrambling the signal in accordance with the present invention is generally illustrated in block diagram form in FIGS. 3A and 3B. Referring to FIG. 3A, the transmitting end of the encoding system includes a program source 10 which generates a composite video signal CVS comprising video information and synchronizing signals. The program source 10 can include a suitable conventional video camera and associated synchronizing circuitry, a video recorder, or any other source that provides a suitable composite video signal. The composite video signal CVS is fed to a sync generator 12 that extracts timing information from the synchronizing signals. This timing information includes a clock pulse train having a frequency $f_H$ equal to that of the horizontal sync pulses in the composite signal. The $f_H$ clock pulse train is supplied to a master clock circuit 14 that produces other timing signals for control of the encoding operation.

In addition to the $f_H$ clock pulse train, the sync generator 12 produces a code insertion enable signal INEN that is applied to a codes insertion unit 16, which also receives the composite video signal CVS. Line counters can be included in the sync generator 12 to provide the INEN signal during predetermined portions of each field of the video signal. For example, the INEN signal can enable the codes insertion unit 16 to insert appropriate codes into the composite video signal CVS during lines 10 through 22 in the first field of each frame and in lines 272 through 284 in the second field. These codes can be inserted by modifying the blank video intervals in these lines. They are preferably inserted in the blanking interval so as not to appear as video.

The output signal from the codes insertion unit 16 is a modified composite video signal MCVS that includes the inserted codes. This signal is supplied to a cyclic encoder 18, which selectively scrambles the signal, for example by rearranging portions of the lines of video in the modified composite signal MCVS in the manner illustrated in FIGS. 2A and 2B. The encoded output signal ECVS from the cyclic encoder 18 is applied to a suitable conventional transmitter 20 to appropriately modulate the vision carrier and be transmitted via airwaves, hardwired cable, or any other suitable transmission medium or combination of two or more of them.

The rate at which the cyclic encoder operates is controlled by a $2f_H$ clock signal generated by the master clock circuit 14, which clocks the encoder twice during each horizontal scan line. This clock signal can be generated, for example, by a phase-locked loop (not shown) within the master clock circuit, which receives the $f_H$ input signal. The $2f_H$ signal from the phase-locked loop is applied as an output signal to the cyclic encoder 18 and to a suitable frequency divider (not shown) within the master clock circuit 14 that generates an encoder clock signal ECLK that is supplied to an encoder control unit 22. The $f_H$ input signal can also be supplied to a second phase-locked loop within the master clock circuit 14 which produces a high frequency clock signal WCLK that is provided to the encoder control unit 22 and to the codes insertion unit 16 to be inserted into the composite video signal CVS.

The operation of the cyclic encoder 18 is controlled by a pseudo-random binary sequence signal PRBS generated by the encoder control unit 22. The PRBS signal contains a series of binary ones and zeros arranged in a pseudo-random order. The particular state of the PRBS signal at any one time instructs the cyclic encoder 18 to either scramble the MCVS signal in the manner described previously to result in a signal such as is shown in FIG. 2B, or to remain idle and enable the MCVS signal to pass to the transmitter 20 in an unscrambled state as shown in FIG. 2A.

The encoder control unit 22 includes a pseudo-random binary sequence generator 24 for producing the PRBS signal. The operation of the generator 24 is influenced by a setup or control word, TAPS, that determines the manner in which binary state information is routed within the generator to establish the PRBS output signal. The TAPS signal is generated at the transmitting end in an encrypted form, and supplied to the codes insertion unit 16 for insertion into the MCVS signal. It is also provided to a decryptor 26 within the encoder control unit 22 where it is unscrambled and supplied to the PRBS generator 24. The decryption of the TAPS word is controlled by a master key stored within a memory unit 28 within the encoder control unit.

The PRBS generator 24 is enabled to produce the PRBS signal by an enable gate signal ENGT generated by the sync generator 12. For example, it can be enabled during lines 22 through 262 of each field, to thereby scramble the lines of video that appear on the television display screen while leaving intact the earlier lines of each frame that contain the codes inserted into the CVS signal. Each time that the generator 24 is disabled, it produces a state word STAT that indicates the state of each of its registers. This STAT word is supplied to the codes insertion unit 16 to be transmitted with the codes inserted into the beginning of the next field of the CVS signal.

In addition to the previously described information that is inserted into the CVS signal to produce the MCVS signal, the codes insertion unit 16 can insert information relating to control of the decoders in a pay television system. For example, the subscriber control information can include billing data that is stored at a subscriber's decoder to describe the particular programs that are viewed by a subscriber, and category information that enables or disables a particular decoder in dependence upon the content of the program or the like.

Figure 3B:
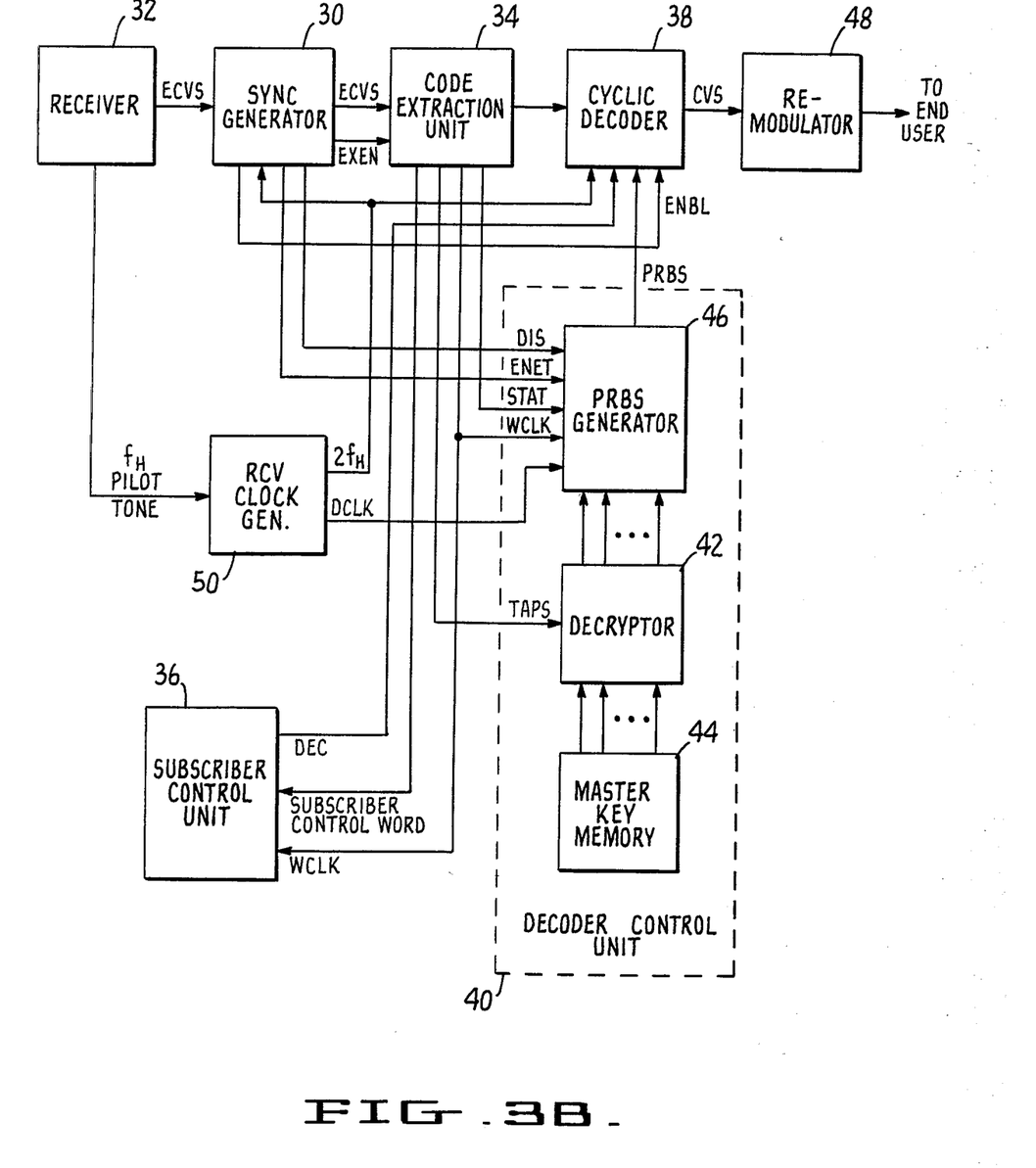
FIG. 3B is a block circuit diagram of the receiving end of a television encoding/decoing system embodying the present invention.

At the receiving end of the encode/decode system, illustrated in FIG. 3B, the received encoded video signal ECVS is applied to a sync generator 30 by a conventional receiver circuit 32 which can provide appropriate demodulation of the received signal. The sync generator counts the lines of each field in a frame of the video program and produces an extraction enable signal EXEN and an enable gate signal ENGT at appropriate times during each field of the signal. The extraction enable signal EXEN is applied to a code extractor unit 34 which reads the subscriber control information, the encoded TAPS setup word, the word clock WCLK and the state word STAT from the received signal, and replaces them with a blanking level signal. The subscriber control information and the word clock are supplied to a subscriber control unit 36, which allows the subscriber to accept encoded programs for viewing. Upon indication of acceptance by the subscriber, the control unit generates a decode enable signal DEC that is provided to a cyclic decoder 38. In addition, it can store the billing information contained within the received signal for subsequent access by a central billing computer, as disclosed more fully in U.S. Pat. No. 4,163,254.

The TAPS word and the STAT word from the code extraction unit are provided to a decoder control unit 40 that generates a PRBS signal. The decoder control unit 40 includes a decryptor 42 that receives the encrypted TAPS word, decodes it according to the master key stored in a memory unit 44, and applies it to a PRBS generator 46. This generator operates in response to the enable gate signal ENGT from the sync generator 30 and the STAT word from the code extraction unit 34 to generate the PRBS signal.

The decode enable signal DEC andthe PRBS signal actuate the cyclic decoder 38 to selectively rearrange the half-line segments of video from the scrambled state illustrated in FIG. 2B to the unscrambled state illustrated in FIG. 2A, and produce a decoded composite video signal CVS. This signal is applied to a remodulator 48 that remodulates it to any desired user's frequency band, for subsequent viewing of the program on a conventional television receiver.

The timing of the operations performed in the decoding system is controlled by a receiver clock generator 50 that receives the $f_H$ clock pulse train, which can be transmitted as a pilot tone with the encoded video signal ECVS. Alternatively, the $F_H$ clock pulse train can be determined by the sync generator 30 from the horizontal sync pulses in the unscrambled vertical blanking interval of each field in the received signal. A phase-locked loop (not shown) within the clock generator 50 receives the $f_H$ pilot tone and produces a $2f_H$ output signal that is applied to the cyclic decoder 38, and possibly also to the sync generator 32. The clock generator 50 also generates a low frequency clock signal DCLK that is supplied to the PRBS generator 46 for the decoder control unit.

A cyclic encoder 18 or decoder 38 for arranging and rearranging parts of the composite video signal in the manner shown in FIGS. 2A and 2B is illustrated and explained in greater detail in FIGS. 4-7. The encoder/decoder comprises an odd number (i.e. 2n+1, where n is an integer greater than zero) of analog delay elements 52. Each delay element 52 provides a discrete time delay to a signal applied to its input terminal. In the embodiment illustrated in FIG. 4, n=1 and the time delay provided by each delay element is $\frac{1}{2}$ $T_H$, where $T_H$ is the scan period for each horizontal line in the television signal. In the most preferred embodiment of the invention, each analog delay element is a charge-coupled device (CCD). Such a device is preferred because it provides a delay time that is precisely controlled in accordance with an input clock frequency.

Figures 4, 5:
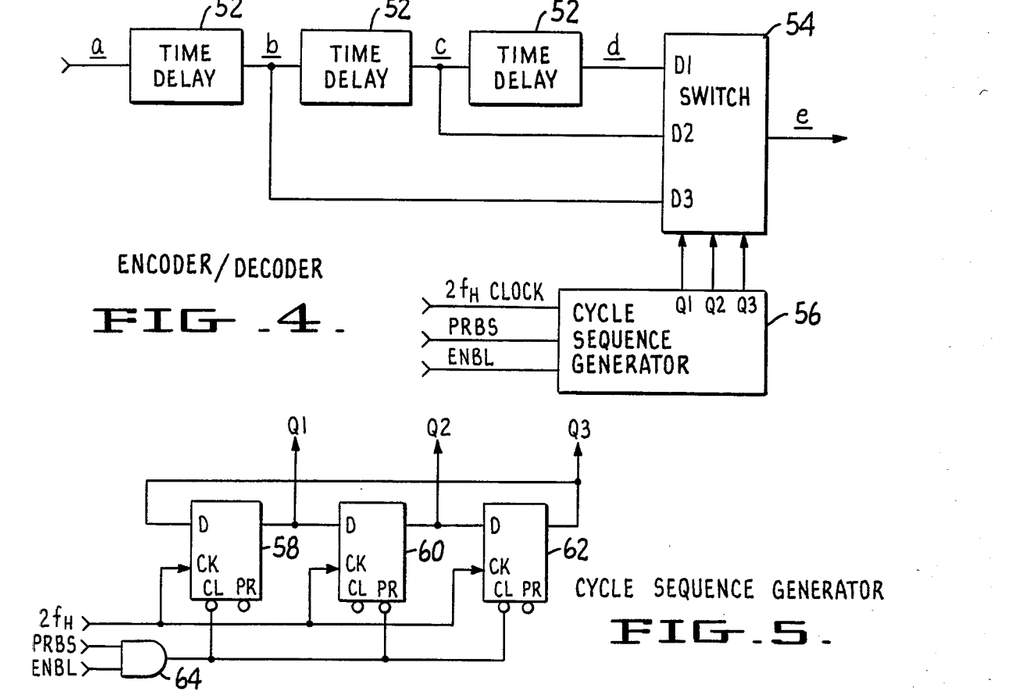
FIG. 4 is a block circuit diagram of a cyclic encoder/decoder circuit.
FIG. 5 is a logic diagram of a cycle sequence generator.

The three delayed signals provided by the three delay elements 52 are respectively provided to the data input terminals D1–D3 of a three-throw, single pole switch 54. The particular one of the input terminals that is connected to the output terminal of the switch is determined by an input control signal generated by a cycle sequence generator 56. As depicted in FIG. 4, the cycle sequence generator includes three output lines Q1–Q3 that are connected to three control input lines of the switch 56. The generator produces a signal on each line in sequence to successively connect each one of the data input terminals of the switch to its output terminal in a continuing sequence.

The time sequence of the connection of the switch output terminal to the various switch input terminals defines the encoding/decoding cycle. The encoding cycle may be any time sequential pattern wherein the switch output terminal is connected to the various data inputs for a length of time equal to $\frac{1}{2}$ $T_H$, as long as all the signal elements (present in the input signal) are present in the output signal and may be recovered with no omissions and no repetitions of signal elements. A time delay of (2n+2) $\frac{1}{2}$ $T_H$ is experienced by the signal after having passed through the cyclic encoding or decoding operation. Of course, this excludes time delay due to passage through the transmission medium.

Two general encoding cycles or modes can be used. One encoding cycle is obtained when the switch output is continuously connected to the (n+1)$T_d$ delayed signal for a period of time equal to J(2n+1)$T_d$ seconds, where $T_d = \frac{1}{2}$ $T_H$ and J may range from 1 to infinity. A second encoding cycle is obtained when the switch output terminal is sequentially connected to the (n)$T_d$, (n−1)$T_d$, (n−2)$T_d$, . . . (1)$T_d$, (2n+1)$T_d$, (2n)$T_d$, . . . (n+1)$T_d$ delayed signal inputs. Each connection is maintained for a period of time equal to $T_d$, and this encoding pattern may be continued for a length of time equal to L(2n+1)$T_d$, where L may range from 1 to infinity. The PRBS signal is used to alternately switch the encoder/decoder between these two modes of operation.

One embodiment of a cycle sequence generator is illustrated in greater detail in FIG. 5. Basically, it comprises three D-type flip-flops 58–62 connected in series to form a shift register. The output terminal of the last flip-flop 62 in the series is connected to the data input terminal of the first flip-flop 58. Each flip-flop is clocked by the 2$f_H$ clock signal. An AND-gate 64 has the PRBS signal and an ENBL enable signal applied to its two input terminals. In the case of a decoder, the decode enable signal DEC can be applied to a third input terminal of the AND-gate 64. The output terminal of the AND-gate is inverted and connected to the clear, or reset, terminal of two of the flip-flops 58 and 62, and to the preset terminal of the other flip-flop 60.

Figure 6:
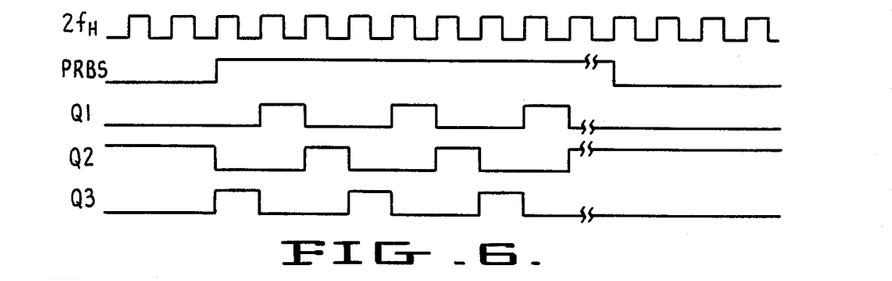
FIG. 6 is a timing diagram for the cycle sequence generator of FIG. 5.

The operation of the cycle sequence generator of FIG. 5 is shown in the timing diagram of FIG. 6. When one or both of the PRBS and ENBL signals is low, the output of the AND gate is low, causing the flip-flops 58 and 62 to be held in a reset state and the flip-flop 60 to be held in a set state. Thus, the Q1 and Q3 output signals of the cycle sequence generator are low and the Q2 output signal of the generator is high. Consequently, the D2 input terminal will remain connected to the output terminal of the switch, so that the output signal from the second delay element 52 will be presented as the output signal, i.e., the cyclic encoder/decoder operates in the first coding cycle. In other words, the output signal will be delayed by the length of one full horizontal scan period relative to the input signal to the encoder/decoder.

When both the ENBL and PRBS signals are high, the high output signal from the AND gate 64 removes the clear and preset signals from the flip-flops 58–62, and enables a binary one bit to be shifted through the register formed by the flip-flops. This shifting occurs on the leading edge of each pulse in the 2$f_H$ clock signal for as long as the PRBS bit is a binary one. Thus the delayed signals appearing at the D1, D2 and D3 input terminals successively appear at the output terminal of the switch 54 to carry out the second coding cycle.

Figure 7:
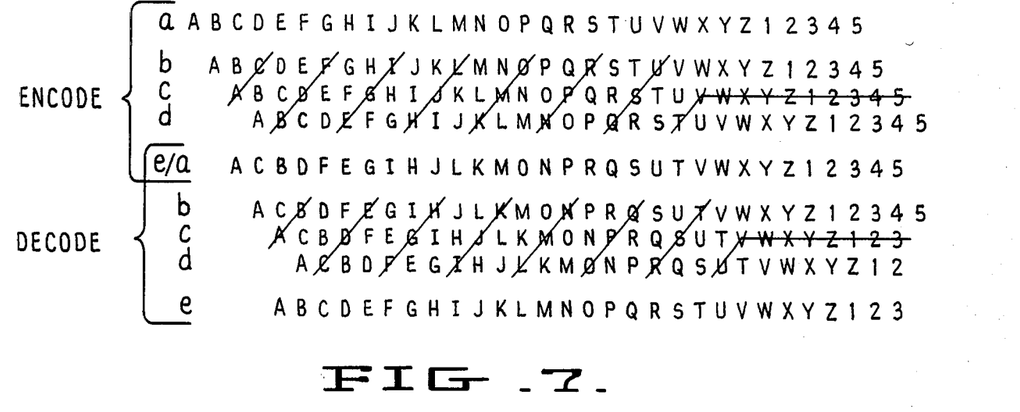
FIG. 7 is a time sequence diagram illustrating the results of the encoding and decoding operations performed by the cyclic encoder/decoder of FIG. 4.

The manner in which this cyclic operation of the encoder/decoder functions to provide a scrambled signal is illustrated in FIG. 7. The undelayed video signal is labeled a in FIGS. 4 and 7. The output signals of the three delay elements 52 are labeled b̄, c̄ and d̄, respectively, and the output signal from the switch is labeled ē. In FIG. 7, successive half-line segments of the video signal are labeled A, B, C . . . in the same fashion as in FIG. 2A. The particular one of the output signals b̄, c̄ or d̄ that is provided to the output terminal of the switch 54 is indicated by the line through that signal in FIG. 7. When the PRBS bit goes high, an unscrambled video input signal results in a scrambled output signal ē (A, C, B, D, F, E, G, I, H . . . ). Thereafter, when the PRBS goes low, the output signal ē is the same as the input signal a, except delayed by one horizontal scan period. Similarly, the decoder is operated in the same manner to rearrange the scrambled input signal a to produce a decoded signal e when the PRBS bit is high.

In order to eliminate switching transients due to the break in the middle of each horizontal line, which could cause an annoying line down the middle of the television display screen, the video information in two adjacent time delay elements 52 of the encoder/decoder is preferably overlapped by a minimum predetermined amount. This feature can be accomplished by appropriate control of the timing and input signals to the charge-coupled devices so that the first few samples of the signal in one device are the same as the last few samples in the immediately preceding device. During switching from one data input terminal to another in the switch 54, the latter input terminal is connected to the output terminal prior to disconnecting the former input terminal, so that both are connected for the predetermined overlap time. To compensate for the extra time allotted to the video portion of each line, the horizontal sync pulse can be correspondingly shortened in length during storage in the delay element.

Figure 8:
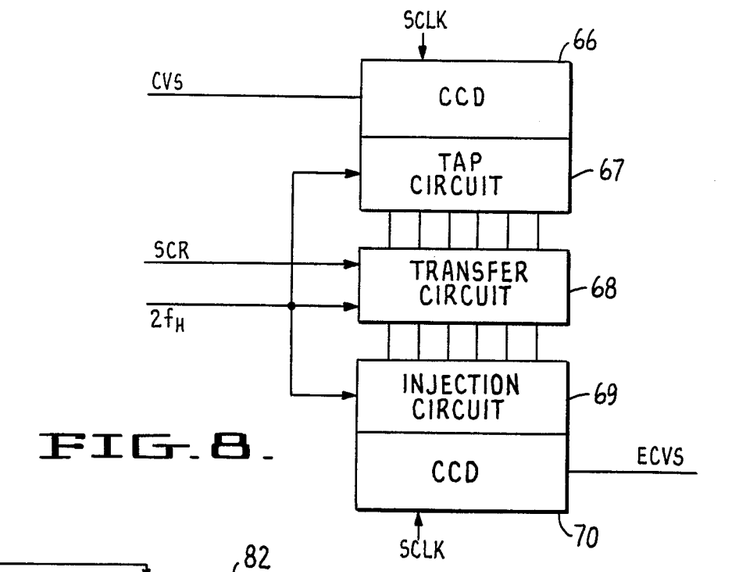
FIG. 8 is a block circuit diagram of a second embodiment of an encoder/decoder.

A second embodiment of an encoding/decoding device is illustrated in FIG. 8. In this embodiment, the rearrangement of the parts of the video signal is not necessarily done in a cyclic manner as in the preceding embodiment, but rather can be carried out in a more random, yet predetermined, fashion. The composite video signal CVS, or modified composite video signal MCVS from the codes insertion unit 16, is fed into an analog shift register, such as a charge-coupled device 66, at a suitable sampling rate determined by a clock signal SCLK. The samples of the portion of the signal stored therein, e.g. a horizontal line, one-half of a horizontal line, or some other suitable portion of the video signal, are read out in parallel by a tap circuit 67. The CCD 66 and the tap circuit 67 could be formed by a Reticon TAD-32 tapped analog delay, for example.

The parallel output signals from the tap circuit 67 are fed to a transfer circuit 68. This circuit selectively rearranges the order of the video signal samples in a predetermined fashion in response to a scramble control signal SCR, that may be determined by the binary states of the PRBS and ENBL signals, for example. The transfer circuit 68 can be implemented with a circuit that is analogous to the demultiplex switch for the Fairchild 321A analog shift register, for example. Essentially, this circuit selects one of a number of input signals and presents it as the output signal. In a simplest form, the transfer circuit 68 could operate on one of two modes to selectively leave the samples in their original order or reverse their order. At the other extreme, it could have a number of interconnect patterns equal to the factorial of the number of samples in the CCD 66. The particular interconnect pattern that is used at any one time could be determined by the control signal SCR.

The selectively scrambled samples from the transfer circuit 68 are fed to an injection circuit 69, that transfers them into a second CCD 70 at suitable time intervals. For example, when one-half of a video line is stored at a time, the transfer from one CCD 66 to the other CCD 70 can be controlled by the $2f_H$ clock signal. The injection circuit 69 comprises a parallel in/serial out transfer device. The injection circuit 69 and the CCD 70 could be formed by a Reticon R5501/PISO-32 charge transfer device, for example. The signal stored in the CCD 70 and read therefrom comprises the encoded video signal ECVS.

As the ECVS signal is being read from the second charge-coupled device 70, the next portion of the video signal can be read into the first CCD 66.

Figure 9:
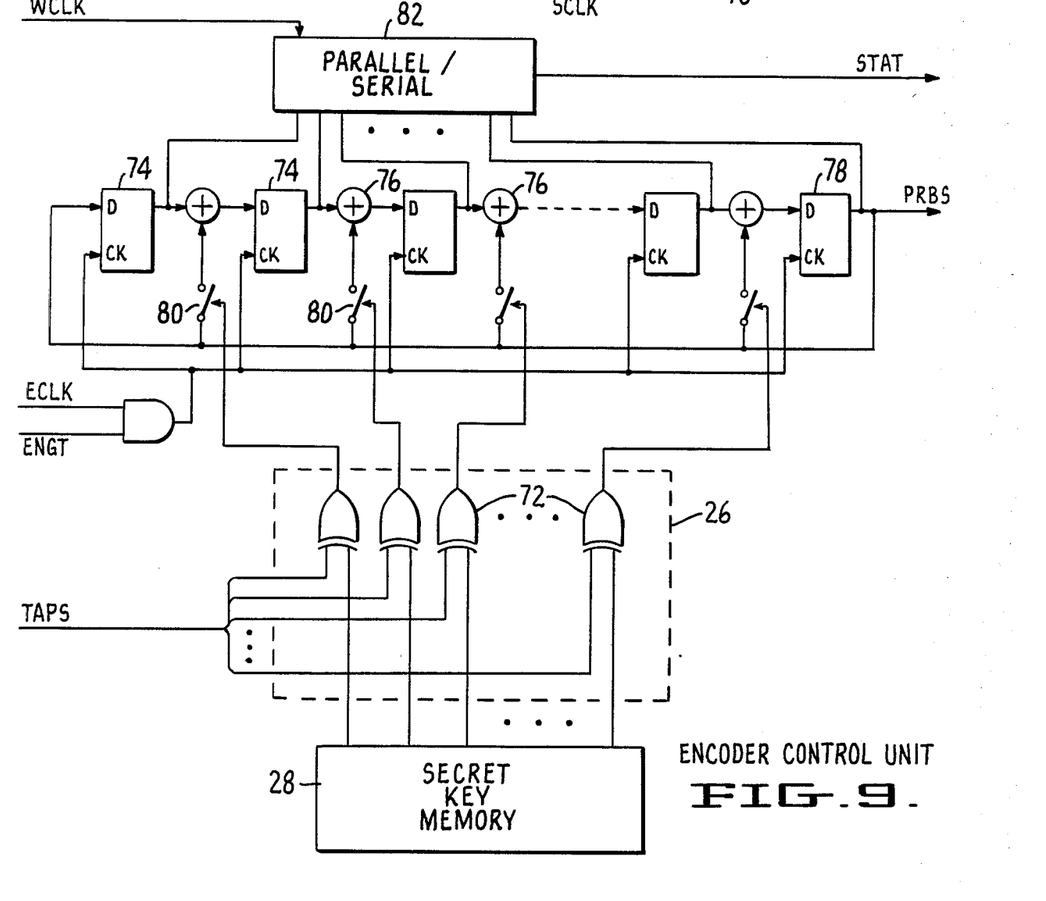
FIG. 9 is a block and logic circuit diagram of an encoder control unit.

A more detailed illustration of a preferred embodiment of the encoder control unit 22 appears in FIG. 9. The master key memory 26 can comprise a read-only memory (ROM) that produces a multi-bit output signal relating to the key. Alternatively, it can be a programmable read-only memory (PROM), or an erasable programmable read-only memory (EPROM) so that the key can be changed periodically by a transmitted signal rather than by physically replacing the ROM or PROM. Each of the output bits of the memory 28 are respectively fed to one input terminal of an EXCLUSIVE-OR gate 72 in the decryptor 26. The other input terminals of the EXCLUSIVE-OR gates 72 receive a bit of the encrypted TAPS setup word. The output signals from the EXCLUSIVE-OR gates 72 comprise the decrypted TAPS setup word, which is applied to the PRBS generator 24.

The PRBS generator comprises a series of binary delay elements such as D-type flip-flops 74. A modulo-2 adder 76, i.e. an EXCLUSIVE-OR gate, is inserted between each stage to receive the output signal from one flip-flop and apply it to the D-input terminal of the next succeeding flip-flop. The output signal from the last stage 78, which comprises the PRBS bit, is fed back to the D-input terminal of the first stage. In addition, it is selectively applied to various ones of the modulo-2 adders 76 by tap switches 80 that are actuated by the TAPS setup word. These switches are preferably digitally controlled switches. All of the flip-flop stages 74,78 are clocked by the ECLK clock signal from the master clock circuit 14.

The PRBS generator 24 generates a long binary code sequence that, for time intervals less than the code sequence repetition period, exhibits statistical properties similar to truly random thermal noise. The sequence length of one form of PRBS generator, of the type illustrated in FIG. 9, is given by $2^n - 1$ bits, where n is the number of stages of binary delay. For this arrangement, the code sequence will repeat with a period:

$$\text{Sequence Repetition Period} = \frac{2^n - 1}{f} \text{ seconds}$$

where f is the frequency of the ECLK clock signal. For a particular length, n, of delay elements there exist only certain feedback configurations to the stages that always allow the generation of codes with length $2^n - 1$. In the embodiment of FIG. 9, the feedback is established by closing the appropriate tap switches 76. Preferably the number of stages n is chosen to be sufficiently large so that the sequence repetition period is longer than the time between updates of the generator, e.g. longer than the length of one field in the video signal. By varying the TAPS setup word after each field, or less frequently as desired, the particular binary sequence that is generated will be changed on a periodic basis, thereby further minimizing unauthorized decoding.

The output signal from each of the flip-flops 74,78 is applied to a parallel-to-serial shift register 82, whose output signal comprises the STAT signal describing the status of the PRBS generator. As described previously, this signal is supplied to the codes insertion unit 16 to be periodically inserted into the video signal.

Figure 10:
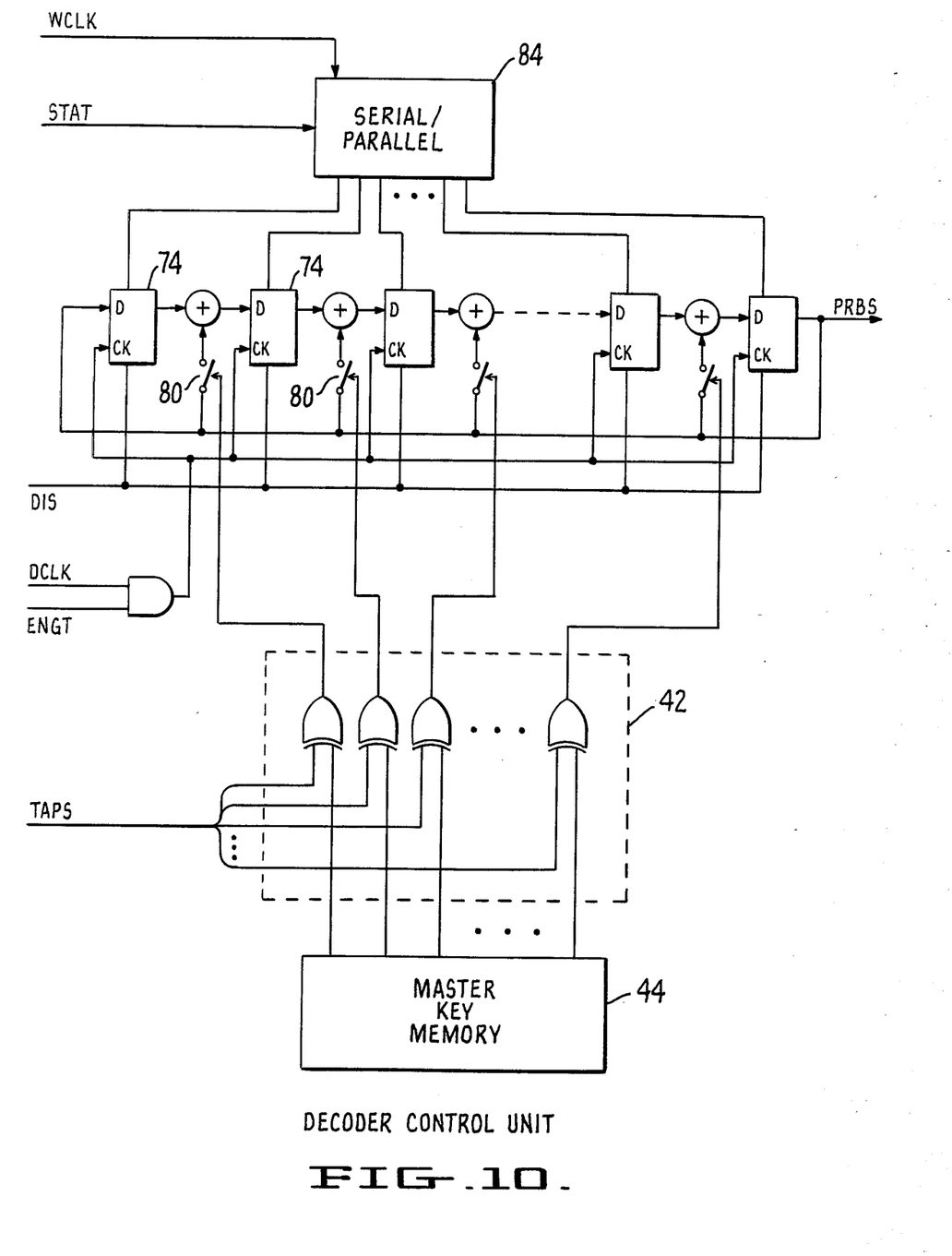
FIG. 10 is a block and logic circuit diagram of a decoder control unit.

The decoder control unit 40 is generally similar to the encoder control unit 26, as illustrated in FIG. 10. More specifically, the decrypted TAPS setup word actuates selected tap switches 80 to control the feedback arrangement of the PRBS generator 46. The flip-flops 74 in the generator are periodically cleared by a disable signal DIS generated by the sync generator 30, which sets the output signals of all of the stages to zero. The STAT signal is fed into a serial-to-parallel shift register 84, whose output signals are applied to the preset input terminals of the flip-flops 74 after the flip-flops have been cleared. Thus, when a receiver is first turned on, its PRBS generator will be initialized so that its status is the same as that of the generator at the transmitting end.

Upon recognition of a synchronization signal in the received video signal, the sync generator 30 produces the enable gate signal ENGT that is applied to an AND-gate 86 in the PRBS generator 46. This enable signal allows the DCLK clock pulses to be applied to the flip-flops 74 to generate a new PRBS signal after initialization. The synchronization signal can be the horizontal sync pulse for any particular line in the field of the received video picture, for example.

Figure 1E:
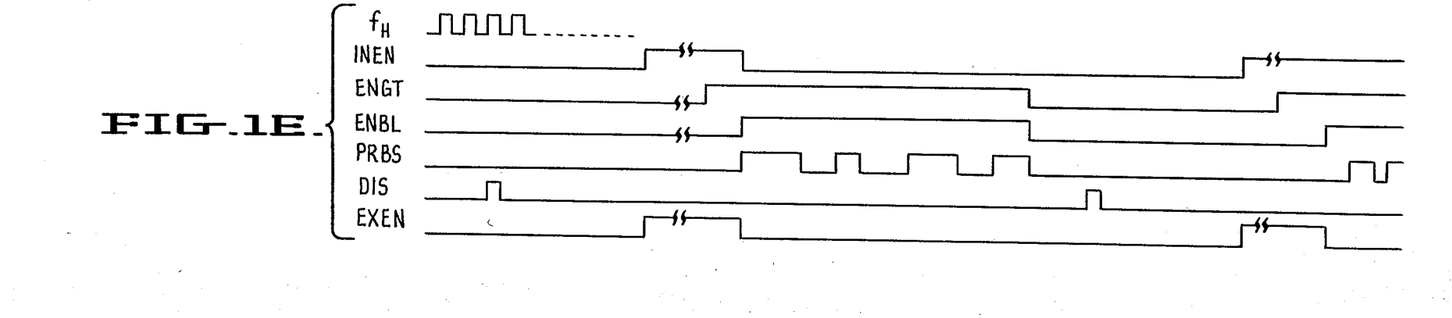
FIG. 1E is a timing diagram showing the relationship of various control signals used in the invention to the television signal of FIG. 1A.

In operation, at at the beginning of a field of the television program signal, a TAPS setup word is generated at the transmitting end and applied to the encoder control unit where it is decrypted to control the feedback arrangement of the PRBS generator 24. When the sync generator 12 detects the tenth line of the field, for example, it generates the insert enable signal INEN, as illustrated in FIG. 1E. This signal is applied to the codes insertion unit 16 to enable the TAPS signal, the subscriber control word, the STAT signal from the register 82 and the word clock WCLK from the master clock circuit 14 to be inserted into the vertical blanking interval of the video signal. At a predetermined synchronization point in the video signal, for example the sync pulse for the twentieth line in the field, the clock enable gate signal ENGT is generated to enable the PRBS generator to begin producing the PRBS signal. However, this signal will not actuate the cyclic encoder 18 since the encoding enable signal ENBL is still low.

At the twenty-second line of the field, for example, the ENBL signal from the sync generator goes high, to thereby alternately operate the cyclic encoder 18 in the first and second modes in accordance with the state of the PRBS bit. The resulting signal ECVS from the cyclic encoder is sent to the transmitter 20 to be broadcast or otherwise transmitted. Alternatively, the enable gate signal ENGT can be applied to the encoder 18 as the ENBL signal, to thereby actuate the encoder at the same time as the PRBS generator.

At the receiving end of the system, the sync generator 30 counts the lines in each field and produces the PRBS generator disable signal DIS to clear the stages of the generator. This signal is produced relatively early in the field, for example upon detection of the third horizontal scan line. In the tenth through twenty-second lines the extract enable signal EXEN is generated to permit the TAPS setup word, the subscriber control, the STAT initialization word and the word clock WCLK to be read from the received signal. The TAPS word is applied to the decrypter 42 of the decoder control unit to be decrypted and arrange the feedback format of the PRBS generator 42. The STAT word is applied to the flip-flops of the PRBS generator 42 to initialize it according to the status of the PRBS generator 24 at the end of the preceding field.

When the sync generator 30 detects the horizontal sync pulse for the twentieth line it produces the clock enable gate signal ENGT to initiate actuation of the PRBS generator 42 and simultaneously synchronize it with the PRBS generator 24. Upon detection of the twenty-second line, the decode enable signal ENBL is generated.

In the meantime the subscriber control information in the transmitted signal is extracted and supplied to the subscriber control unit 36. If the subscriber decides to view the program being transmitted and if the subscriber's particular decoder is enabled by the control information, the subscriber provides an accept indication that causes the decode signal DEC to be generated. This signal is applied to the cyclic decoder, and with the enable signal ENBL, permits the decoder to be selectively actuated in one of its two modes according to the binary state of the PRBS signal, to thereby rearrange the parts of the video signal to their original order.

It will be appreciated by those of ordinary skill in the art that the present invention can be embodied in forms other than those specifically disclosed herein. For example, the parts of the video signal that are rearranged to encode the signal need not be half-line segments of each horizontal scan. They can be multiple segments of a line, full lines, groups of lines, fields, etc., depending on the storage capacity and setup of the analog delay elements. In such cases, the delay time of each analog delay element and the frequency at which the cycle sequence generator is clocked would be correspondingly changed. In another variation, more than three delay elements can be utilized in the cyclic encoder to provide a greater number of parts that are rearranged relative to one another.

In addition, the cyclic encoding and decoding of the signal need not be carried out at the baseband frequency. The video signal can first be modulated onto an RF carrier signal, and the resulting signal encrypted before transmission and decrypted before demodulation.

In another aspect of the invention, an encoding device other than a cyclic encoder can be utilized to scramble the video signal. Any type of encoder that is capable of operating in two or more modes under control of the PRBS signal can be successfully employed. In this regard, the PRBS signal can comprise more than one bit to control the encoder in a number of different modes. For example, the various bits can be extracted from various stages in the PRBS generator.

It would also be feasible to encrypt the STAT initialization word in addition to the TAPS word, prior to transmission, under the control of a second master key, to thereby further increase the security against unauthorized decoding.

The presently disclosed embodiments are therefore considered in all respects to be illustrative and not restrictive. The scope of the invention is indicated by the appended claims rather than the foregoing description, and all changes that come within the meaning and range of equivalency of the claims are therefore intended to be embraced therein.

What is claimed is:

1. Apparatus for transmitting an encoded television signal to prevent unauthorized viewing of a television program, comprising:
   a program source for generating a composite video signal;
   a plurality of delay elements connected in series to receive successive parts of the composite video signal;
   a switching device having a plurality of input terminals respectively connected to said delay elements to receive a delayed composite video signal, and an output terminal that is selectively connected to one of said input terminals;
   means for controlling said switching device to alternately (a) maintain said output terminal connected to one of said input terminals, and (b) sequentially connect said output terminal to each of said input terminals in a cyclic manner, to thereby generate an encoded video signal; and
   means for transmitting the encoded video signal.

2. The apparatus of claim 1 wherein said controlling means includes a pseudo-random binary sequence generator.

3. The apparatus of claim 2 further including means for detecting predetermined portions of the television program and enabling said binary sequence generator to operate during a period related to said predetermined portions.

4. The apparatus of claim 3 further including means for inserting into the composite video signal a state word related to the status of the binary sequence generator at the end of an enabling period.

5. The apparatus of claim 2 further including means for generating a setup signal to periodically change an operating parameter of said binary sequence generator.

6. The apparatus of claim 5 further including means for transmitting said setup signal with the encoded video signal.

7. The apparatus of claim 6 wherein said setup signal is transmitted in an encrypted form.

8. The apparatus of claim 5 wherein said setup signal is generated in an encrypted form and said controlling means includes means for decrypting said setup signal.

9. The apparatus of claim 8 further including means storing a master key for controlling said decrypting means.

10. The apparatus of claim 1 wherein the parts of the video signal in two adjacent delay elements overlap one another.

11. The apparatus of claim 1 wherein each of said delay elements stores a portion of a horizontal scan line of the video signal.

12. The apparatus of claim 1 wherein each of said delay elements stores a plurality of horizontal scan lines of the video signal.

13. Apparatus for decoding an encoded video signal having parts thereof that are rearranged relative to other parts, comprising:
means for receiving the encoded video signal;
a plurality of analog delay elements connected in series to receive successive parts of the received signal;
switching means for selecting a delayed output signal from one of the delay elements;
means for controlling said switching means to select the output signal from a predetermined one of said delay elements in a first mode and to sequentially select the output signal from each of the delay elements in a cyclic fashion in a second mode; and
means for receiving the selected output signals from the switching means as a decoded video signal.

14. The apparatus of claim 13 wherein said controlling means includes a pseudo-random binary sequence generator for generating a control signal that determines the mode of operation of said switching means.

15. The apparatus of claim 14 wherein the received signal includes a status word, and further including means for presetting the state of said binary sequence generator in accordance with the status word.

16. The apparatus of claim 14 wherein the received signal includes a setup word for establishing an operating parameter of the binary sequence generator, and further including means for controlling said operating parameter in accordance with said setup word.

17. The apparatus of claim 16 wherein said setup word is received in an encrypted form, and said controlling means includes means for decrypting the received setup word and applying the decrypted word to said parameter controlling means.

18. A method for enabling only authorized television receivers to display a television program in an intelligible manner, comprising the steps of:
generating a television program signal;
generating a pseudo-random binary signal at an encoding station;
alternately arranging parts of the program signal relative to one another in one of two predetermined orders in accordance with the binary signal, to thereby form an encoded program signal;
transmitting the encoded program signal and a status signal relating to the generation of the binary signal at the encoding station;
storing successive parts of the transmitted signal at an authorized receiver;
independently generating the pseudo-random binary signal at the receiver;
synchronizing the independent generation of the pseudo-random binary signals by initializing the generation of binary signal at the receiver in accordance with the status signal and initiating generation of the binary signal upon receipt of a predetermined portion of the transmitted signal;
sequentially retrieving the stored parts of the signal;
selectively altering the order of retrieval in accordance with the binary state of the pseudo-random binary signal, to thereby form a decoded video signal; and
applying the decoded video signal to the authorized receiver for display.

19. The method of claim 18 further comprising the steps of:
generating a coding control signal at the encoding station;
controlling the generation of the binary signal at the encoding station in accordance with the control signal;
transmitting the control signal; and
controlling the generation of the binary signal at the receiver in accordance with the control signal.

20. The method of claim 19 wherein said control signal is generated in an encrypted form, and further including the steps of decrypting the control signal at each of the encoding station and the receiver.

21. A method for enabling only authorized television receivers to display a television program in an intelligible manner, comprising the steps of:
generating a television program signal;
generating a psuedo-random signal at an encoding station;
encrypting said television program signal in accordance with said psuedo-random signal;
producing a control signal indicative of a parameter in the generation of said psuedo-random signal at a predetermined time;
transmitting the encrypted television program signal to a receiver station;
transmitting said control signal with said program signal;
providing a decode control key to the receiver station;
utilizing said decode control key and said transmitted control signal to generate a psuedo-random signal at said receiver station;
decoding the encrypted television program signal in accordance with the psuedo-random signal generated at said receiver station; and
applying the decoded program signal to a receiver for display.

22. The method of claim 21 wherein said decode control key is provided to the receiver station by transmitting it in an encrypted form, and further including the step of providing a master key to said receiver station for controlling the decryption of the transmitted decode control key.

23. The method of claim 21 further including the step of periodically varying the decode control key.

24. The method of claim 22 wherein said master key is transmitted to said receiver station and varied periodically.

25. The method of claim 21 wherein said control signal is transmitted with said encrypted program signal.

26. The method of claim 25 wherein said control signal is transmitted in the video portion of the television program signal.

27. The method of claim 21 wherein said pseudo-random signal is a binary signal and said step of encrypting said television program signal includes the step of modifying said television program signal in at least one of two alternating modes of operation respectively related to the two different states of said binary signal.

28. The method of claim 21 wherein said control signal is an initialization signal defining a state of said pseudo-random signal.

29. The method of claim 21 further including the step of synchronizing the generation of the pseudo-random signal at said receiver station with the generation of the pseudo-random signal at said encoding station.

* * * * *